Figure 1:
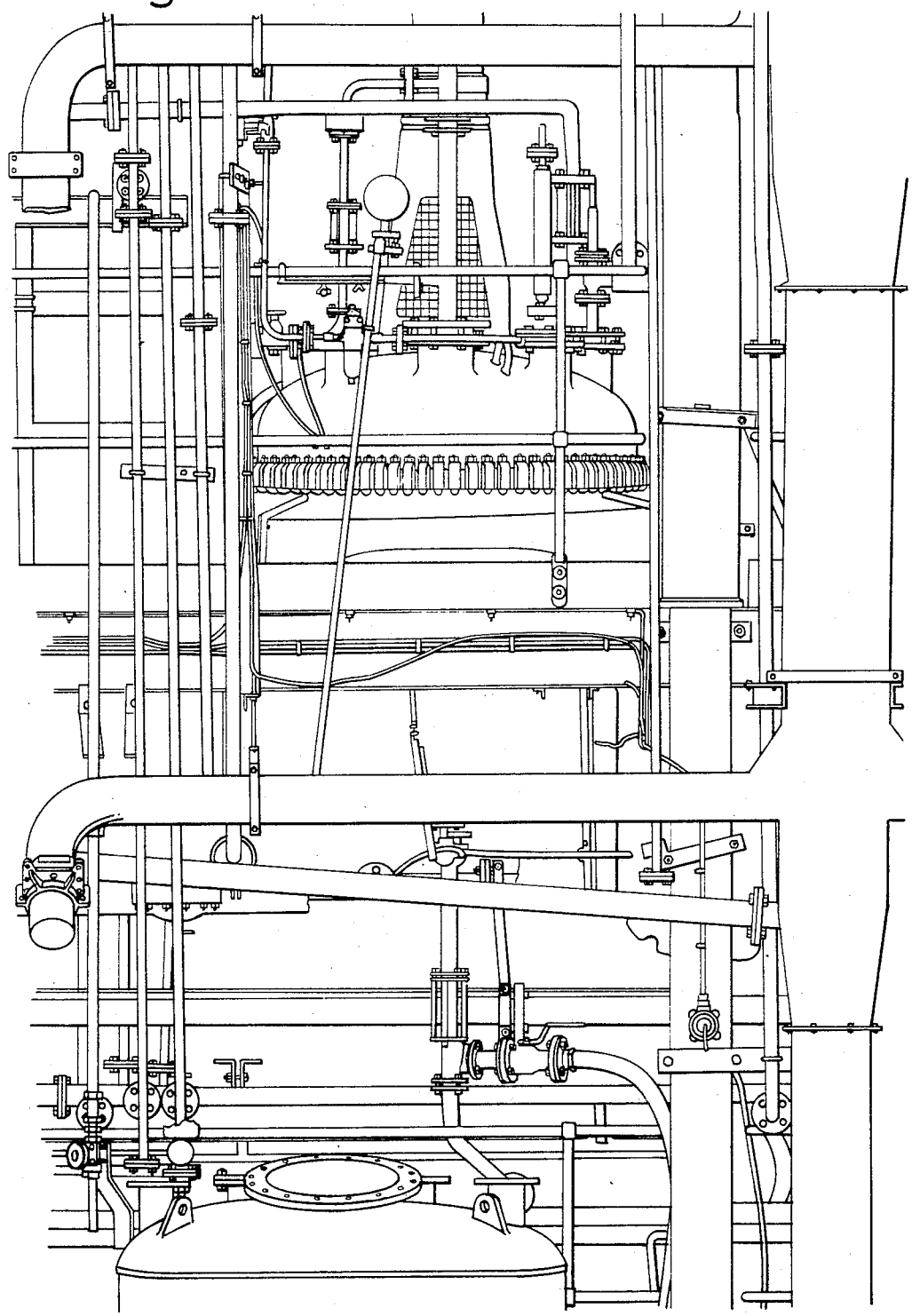

United States Patent [19]

Bracewell et al.

[11] Patent Number: 4,586,145
[45] Date of Patent: Apr. 29, 1986

[54] PHOTOGRAMMETRIC METHOD

[75] Inventors: Philip A. Bracewell, Meltham; Uri R. Klement, Cuddington, both of England

[73] Assignee: Imperial Chemical Industries PLC, London, England

[21] Appl. No.: 463,304

[22] Filed: Feb. 2, 1983

[30] Foreign Application Priority Data

Feb. 17, 1982 [GB] United Kingdom ................. 8204569

[51] Int. Cl.[4] ............................................. G06F 3/14
[52] U.S. Cl. .................................... 364/512; 350/130; 350/136; 364/518
[58] Field of Search ....................... 364/512, 518, 522; 350/130, 133, 136, 162.13; 354/110, 112, 117, 125; 340/705, 721, 723, 724, 731, 734, 747

[56] References Cited

U.S. PATENT DOCUMENTS

| | | | |
|---|---|---|---|
| 3,578,863 | 5/1971 | Farrand | 350/136 |
| 3,927,948 | 12/1975 | Cox et al. | 364/512 |
| 3,989,933 | 11/1976 | Inghilleri | 350/136 |
| 4,317,286 | 3/1982 | Elfick et al. | 350/136 |
| 4,387,989 | 6/1983 | Pirich | 350/162.13 |

Primary Examiner—Errol A. Krass
Assistant Examiner—Heather R. Herndon
Attorney, Agent, or Firm—Cushman, Darby & Cushman

[57] ABSTRACT

Structural details of industrial plants are derived from stereo-pair photographs by analyzing the structure into basic 3D unit shapes. The information is stored in a data store and may be obtained by interrogation of the store, as a direct print out through a graphics display, or via an interfaced graphic display system, such as PDMS. Plant structural designs can be readily modified by altering the basic unit shapes within the data store and/or their parameters.

8 Claims, 7 Drawing Figures

PHOTOGRAMMETRIC METHOD

The invention relates to structures of industrial plants, and in particular to a method for obtaining or generating information about the physical parameters of such structures and to the use of such information in modifying existing plant designs.

A significant amount of design effort in the process industries is spent in retrieving and processing information about plant structures. Such information may be required, for example, for designing minor modifications or for completely revamping existing plants; or indeed simply for up-dating existing records or checking that plants have been constructed accurately to plan. Problems confronting engineers using conventional tools such as tape measures and graduated rods, can arise because the information they provide is not spacially co-ordinated. Ancillary equipment, such as ladders, scaffolding or the like, may be required, thereby increasing the physical difficulties, and when collating the information, omissions are often found, necessitating additional site visits.

We identified photogrammetry as a technique which might usefully be considered for overcoming at least some of the disadvantages associated with conventional methods. Photogrammetry is a technique in which stereo pairs of photographs are used to produce a two dimensional representation of a three dimensional object as a projection of that object on a single plane. It is used extensively for making maps from aerial stereo-pair photographs, and techniques developed for avoiding errors due to camera distortion, parallax and other optical aberrations, have now become standard practice.

However, we found that although photogrammetry tracings from stereo photography of industrial plants looked very impressive, they were in fact still undesirably slow and expensive to produce. Perhaps of greater importance was that they were not truly scaled engineering elevations due to the finite distance of the cameras from the structures, and the information obtained required further dimensional interpretation before it could be used by engineers. We have now conceived and developed a method for deriving the physical parameters of industrial plant and like structures in a form which may relate directly to the users requirements, the method employing photogrammetry techniques and hardware as a basis for the data acquisition, but using a new combination of procedures to derive the physical parameters.

Accordingly we now provide a method for deriving and storing information about industrial plant structures constructed of a plurality of interrelated, three-dimensional, basic unit shapes, the method comprising:

(a) taking stereo-pair photographs of the structure,
(b) mounting the photographs in a photogrammetry stereo comparator having coordinate readout and processing means with associated data base,
(c) effecting orientation procedures to correlate comparator coordinates to the orientation of the structure,
(d) providing a processing means with a mathematical template for each kind of basic unit shape for which the information is required, each template having variable parameters sufficient fully to define the dimensions and orientation of the shape, but initially having nominal values for those parameters,
(e) selecting a first template corresponding to a first unit shape and entering this first template into the data base,
(f) selecting a further template corresponding to a further basic unit shape and entering this further template into the data base,
(g) repeating step (f) until templates are entered into the data base for each basic unit shape about which information is required,
(h) specifying in the data base the manner in which the basic unit shapes for which templates are provided, are interconnected,
(i) viewing through the stereo comparator a first basic unit shape depicted in the stereo-pair photographs and selecting the corresponding template,
(j) aligning the comparator with a plurality of points on the viewed basic unit shape in turn and operating the comparator readout means to obtain the co-ordinates of those points,
(k) calculating from the read co-ordinates the true values for the variable parameters of the corresponding template, and replacing the nominal values with these calculated true values, and
(l) repeating steps (i) (j) and (k) for each template selected, thereby to obtain the values of the parameters for each basic unit shape and their three dimensional interrelation in the structure.

The essence of the present method is that the plant structure is analysed as an assembly of basic unit shapes in three dimensions. Thus for example pipework may be considered as an assembly of cylindrical shapes (the straight lengths of pipe) interconnected by curved portions, T pieces, flanges, valves etc. For the supporting structure, it may be sufficient to consider this as being assembled from planes and boxes, although shapes like I beams may be considered as a different shape from a box, where such detail is required. The shape of equipment can also be described by way of basic unit shapes, a reaction vessel being described as a cylinder plus a dome at each end, for example. More complex features, such as valves, may be represented by simple shapes, such as boxes or cones, to indicate the space they occupy; or more complex equations may be solved for more sophisticated modelling according to needs and processing capacity.

The present method is applicable to a variety of industrial plants in which the structures can be analysed into basic unit shapes. Types of structures to which the method can be applied may be found on chemical plants, oil refineries, atomic power plants, iron and steel works, breweries, food processing plants, and assembly lines, for example; the whole or part of the plant being considered as required or as practicable. Thus, for example, the structure must be sufficiently exposed for the relevant parts to be photographable, preferably using visible light.

Figure 2:
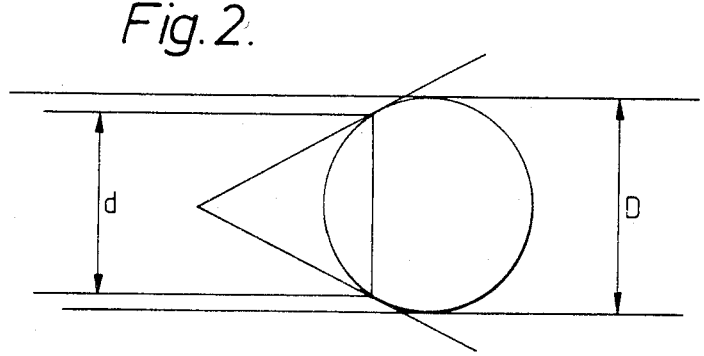
Figure 3:
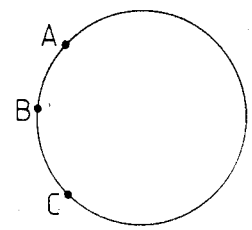
Figure 4:
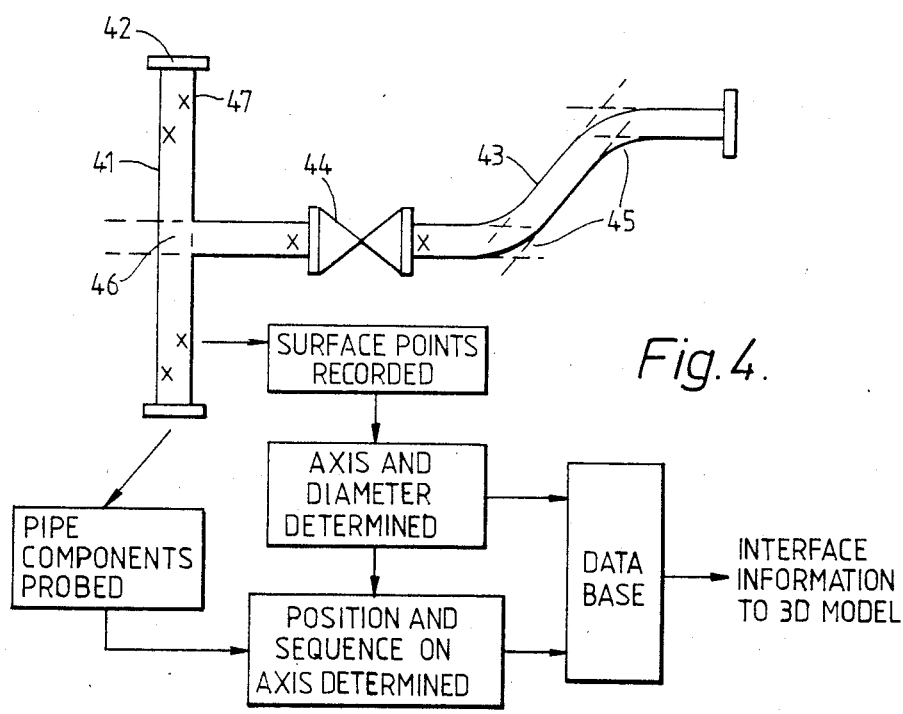
Figure 5:
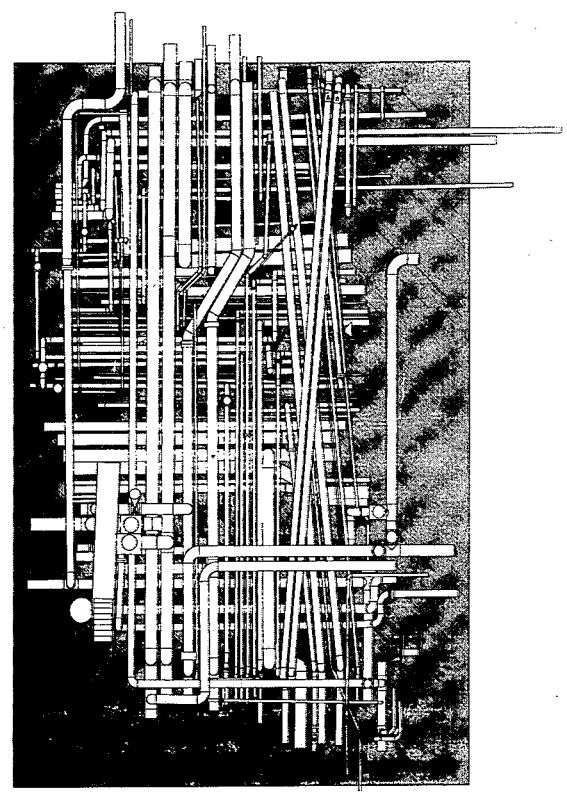
Figure 6:
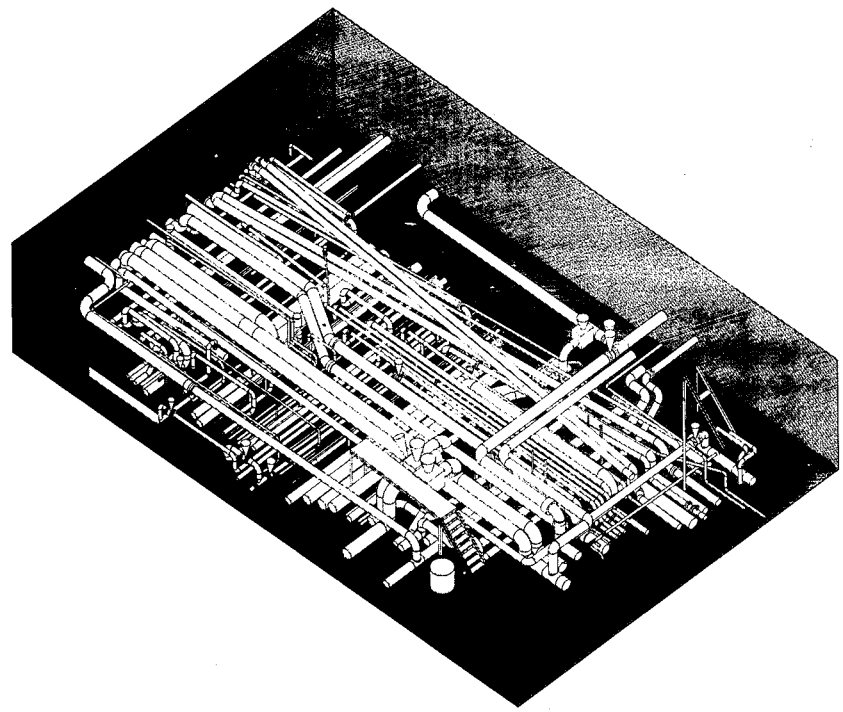
Figure 7:
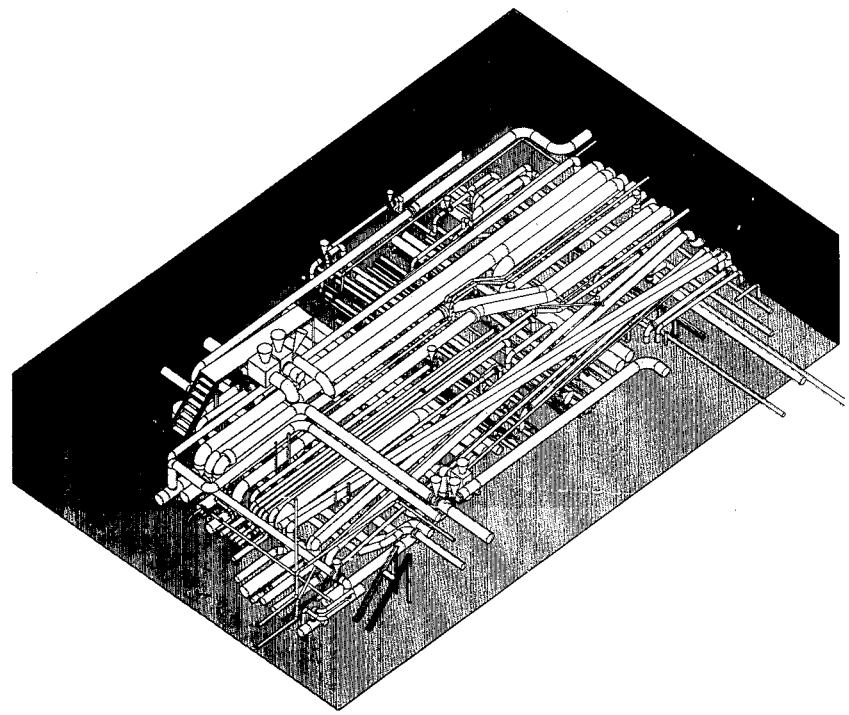

The individual steps of the present method, as listed above, will now be described in greater detail, with indications of one preferred manner of carrying them out; and in parts of the following description reference will be made to the accompanying drawings in which FIG. 1 is an elevation of part of a chemical plant, produced by known photogrammetry techniques on commercially available equipment, FIG. 2 is a diagram of a section through a cylinder to show how scale errors can occur when tracing from photographs taken using close camera positions, FIG. 3 is a further diagram of the same section to show how known basic unit shapes which are variable in size and orientation can be fitted to photogrammetically identified points to avoid the errors of FIG. 2, FIG. 4 shows diagrammatically how information on pipework can be obtained in the data base, and FIGS. 5-7 are reduced scale copies of graphical print-outs produced during an actual determination made by the present method.

The elevation of part of a chemical plant reproduced in FIG. 1 was traced from stereo photographs using a commercial photogrammetry comparator. However, this elevation is not truly scaled due to the finite distance of the cameras from the structure when taking the photographs. Thus for example, where a cylindrical reaction vessel is located near to the camera, the apparent width will be that of only a chord of the circular section rather than its diameter, and so it will be drawn too narrow. This is shown in FIG. 2, where D represents the true diameter and d the diameter as seen and drawn. The present method fits a model of a known basic shape to a number of points to provide accurate scaling. Thus, using the same example, in FIG. 3 the positions of three points A, B, and C on surfaces of the same cylinder (shown in section as a circle) are determined by photogrammetry, and the best circle fitted to those points. Only one circle will fit those three points, so the true diameter is determined. In practice, however, we prefer to measure more than three points, and to calculate the best fitting circle so as to minimise the effect of any errors introduced during measurement of the points.

To take the photographs in step (a), we prefer to use highly accurate cameras designed for photogrammetry work, generally called metric cameras (metric implying measurement rather than a derivation of the meter unit length). These have very small optical distortions, which are themselves known. They also generally have fiducial markers which apply marks to the photographic plate on exposure, enabling the co-ordinates of the plate to be correlated with the optical centre of the camera, readily and with consistency from one photograph to another (facilitating internal orientation in a later step).

The photogrammetry stereo comparator used in step (b), may be a standard apparatus with coordinate readout, preferably in digital form. The processing means is required to solve mathematical equations and to find the best fit for a plurality of points in step (k), and is preferably a computer. The comparator preferably has a window on which the photographs are mounted, which is sufficiently large to take a plurality of stereo pairs. These enable further data to be provided for use in constructing the model, e.g. when part of a unit shape is obscured by other details. By mounting all relevant stereo pairs simultaneously, the orientation procedures of step (c) can be carried out for all pairs, and as the models are correlated directly with the structure (as will be described in more detail below) it makes no difference whether the required data all comes from one stereo pair, or whether the coordinates of some points are obtained from one photograph with other points of the same unit shape being obtained from a different photograph, provided the photographs are identified. It is also possible to take such data from different photographs by mounting them on the window in turn and carrying out the orientation procedures for each in turn. However in practice, when we realise we shall have to read more than one stereo pair, we find it more satisfactory to mount them together so that we can switch from one to the other and back again, as required.

The orientation procedure of step (c) can be standard photogrammetry practice provided the preferred metric cameras are used. The procedure is then carried out in two stages: (c') comprising recording the fiducials of each photograph into the comparator, thereby to determine the orientation of the photographs with respect to the apparatus, often referred to as "interior orientation", and (c'') using known or measured information from the plant to obtain the camera parameters, often referred to as the "absolute orientation". The camera has six degrees of freedom, three positional to define its position in space, and three angular to define its orientation. Some of these could be predetermined on site e.g. by levelling the camera before taking the photographs. Others may need to be determined from measurements, e.g. from a marked 1 m length of vertical pipe or from known interpipe spacing. However, while both interior and absolute orientations in their broad concept are known photogrammetry procedures for correlating the co-ordinates of the apparatus with the features identifiable in the photographs, details of such procedures depend on the specific apparatus used.

The template of a basic unit shape defines its position and orientation. Thus a template with nominal values for a basic cylindrical shape might state, for example:

NAME—FRED
TYPE—CYLINDER
OWNER—STRUCTURE
REFERENCE POSITION—x=o, y=o, z=o
ORIENTATION—$\phi$=o, $\omega$=o, $\kappa$=o
DIAMETER—O
HEIGHT—O Similarly the template for a basic box shape may replace the diameter and height by length, breadth and height. Thus the templates provide all the required information to define the unit shape, and may be tailor-made for each variety. The values used to replace the nominal values (i.e. O) shown, are calculated from the measured points obtained from the photographs using standard equations for at least the known regular shapes, such as cylinders, rectanguloid boxes, and cones (for representing valves) for example FIG. 4 shows a length of pipe 41 with flanges at its ends and a curved side arm 43 carrying a valve 44 within its length. When obtaining data from the stereo photographs, the pipes can be considered as intersecting cylinders. A template is selected for each cylinder and further templates are selected for the valve and flanges. The manner in which these are inter-connected is stated in the data base, e.g. by curved portions 45, T junctions 46 or flanges, and equations are solved for each cylinder in turn using the measured co-ordinates of a number of points on its surface. The solutions obtained are then inserted into the template in the data base, instead of the nominal values initially provided in the template. It is, however, often sufficient, and indeed is generally preferred, for the curved connecting portions between lengths of pipe merely to be stated as curved connections and for the computer to be left to find its own curve which best connects the two pipe ends. Standard complex features can be drawn symbolically, e.g. as the valve 44 as shown in FIG. 4, or as a simplified representative shape which also occupies approximately the space of the true article, e.g. as shown by the conical shapes representing valves in FIGS. 5–7. In the example shown in FIG. 4, crosses 47 are used to indicate some of the points probed, and the sequence of events is indicated in boxes.

Where the operator of the stereo-comparator has to alternate between looking at the photographs through the comparator and looking at the computer terminal to see which point to probe next, considerable fatigue and time loss may be suffered because of the time and effort needed to readjust to the stereo vision in the comparator. Accordingly we prefer to probe each unit shape in a predetermined sequence characteristic of the type of unit shape being viewed, the sequences generally being different for different types of unit shapes. In this way we can be sure to obtain the optimum number of points (which may be greater than the minimum, as explained above) without consulting the terminal between points or even between unit shapes.

Nevertheless, acquiring and using such sequences requires extensive training and a good memory, especially where large numbers of different varieties of basic unit shapes are employed, as may generally occur where unit shapes more complex than the simple cylinders and boxes given herein as illustrations, are used. Our preferred apparatus is one which attacks such problems by providing an audible prompt to remind an operator of the predetermined sequence while that operator continues to view the photographs. This could simply be musical notes at different frequencies, or buzzes the tones, to signify different commands, but we particularly prefer to provide the audible prompt in the form of speech, e.g. by interfacing a speech synthesizer with the processing means. The sequence of commands can be initiated by selection of a corresponding basic unit shape template.

Information obtained and stored by the present method can be used in a variety of ways. For example the information can be output by printing out the templates of one or more unit shapes on a VDU screen or, for more permanent retrieval, onto paper using a printer. Alternatively the data base can be interrogated directly, e.g. to find the distance between two unit basic shapes for possible insertion of a new vessel or pipework between them.

As a further alternative, the data base can be interfaced with various known forms of graphics apparatus to display the interrelated basic unit shapes graphically, either on a VDU screen or via a printer. We prefer to display pipes and other material features as solid objects by removing all hidden lines, e.g. using graphics software which we have developed and which incorporates a hidden line algorithm so that hidden lines can be eliminated, or indeed by using one of the current proprietary hidden line removal programs provided it is compatible with the data base used. However, even then, a graphic display of an industrial plant can sometimes be difficult to comprehend visually, especially when the plant contains a complex pipework system shown as a mass of lines indicating the outer edges of individual pipes, see for example even the simple array of pipes and supporting framework shown in FIG. 1.

We have now found that visual comprehension can be facilitated by shading areas of the display which do not comprise any unit basic shape, and we have devised a way of obtaining this. A preferred method when providing a graphic display, is therefore one which comprises superimposing the combined models of the basic unit shapes and their interconnections onto a model of a shaded plane, and removing hidden detail thereby to remove the shading from those areas of the display representing the basic unit shapes and their interconnections, and so contrasts them with the intervening shaded areas. For black and white displays it is convenient to use close parallel lines for the shading, the obscured lines then being removed, but a dot matrix could be used as an alternative. For colour displays the shading can merely be a different colour. An example of a typical graphic output is shown in FIGS. 5–7, where close parallel line shading is used to enhance visual comprehension by highlighting the pipes and other features. When preparing these the drawings, the hidden lines of the pipes and other features were removed at the same time as the hidden lines of shading, in a single operation, and this is preferred to a method in which the pipe images are solidified before being contrasted against the background shading. In these drawings some of the more complex shapes, like valves for example, have been represented by simple figures such as cones.

When modifying the design of an existing plant, we find it convenient first to carry out a corresponding modification in the data base by a method comprising photographing the plant or part thereof in which the modification is to be made and obtaining the values of the parameters for each basic unit shape in the photographed part and their mutual interrelations by the steps (a) to (l) above, followed by (n) selecting a new template corresponding to a new basic unit shape to be added as a modification to the design, and entering the first new template into the data base with nominal values for the variable parameters, (o) repeating step (n) if necessary until a new template has been entered into the data base for each new basic unit shape to be added, (p) specifying in the data base the manner in which the new basic unit shapes for which templates are provided, are to be interconnected to the existing unit shapes, and (q) entering for each new template true parameter values which define in each case a new basic unit shape which occupies a space not occupied or overlapped by any of the other basic unit shapes in the data base. Where only one new basic unit shape is to be added, there may be no action carried out in step (o).

In some cases it may be necessary to modify or move an existing basic unit shape to make room for a new shape being added. This can be achieved by carrying out a further step which comprises (r) adjusting the variable parameters in at least one existing template thereby to define an existing basic unit shape which occupies a space not occupied or overlapped by any new basic unit shape provided in step (q). Steps (q) and (r) can be carried out in sequence, but for small adjustments in size or position it is generally more convenient to carry them out simultaneously, e.g. by modifying each alternately in a series of small finite steps.

Where the desired modification is one in which an existing basic unit shape is to be replaced by one or more new basic unit shapes it is preferred that this be effected by adding a further step comprising (m) removing from the data base the template corresponding to the basic unit shape to be removed, e.g. by replacing the true parameter values with nominal values which put that basic unit shape outside the structure of the plant. This is preferably carried out before step (n), although it could alternatively be carried out some time between steps (n) and (q).

The above steps provide simple methods for making substantial modifications to the design, whether these modifications be rerouting of pipework, or replacing or adding of new vessels, for example. However, even simpler are modifications which entail alterations to existing unit shapes without changing the number or variety of shapes used, these being achieved merely by changing the values of the variable parameters in the relevant templates. Alternatively, the above replacement procedures could be used, each new template in that case being the modified shape, and the template which is given nominal values in step (m) being the template of the unit shape to be changed. These alternatives, however, are only procedural differences and the most suitable course may depend on the methods used to carry out the calculations, or on program details where a computer is used as the processing means.

We claim:

1. A method for deriving and storing information about industrial plant structures constructed of a plurality of interrelated, three-dimensional, basic unit shapes, the method comprising:
   (a) taking stereo-pair photographs of the structure,
   (b) mounting the photographs in a photogrammetry stereo comparator including a co-ordinate readout, a data base, and processing means for processing information in accordance with said data base,
   (c) effecting orientation procedures to correlate comparator coordinates to the orientation of the structure,
   (d) providing the processing means with a mathematical template for each kind of basic unit shape for which the information is required, each template having variable parameters defining the dimensions and orientation of the shape, said parameters being initialized to nominal values,
   (e) selecting a first template corresponding to a first unit shape and entering this first template into the data base,
   (f) selecting a further template corresponding to a first unit shape and entering this further template into the data base,
   (g) repeating step (f) until templates are entered into the data base for each basic unit shape about which information is required,
   (h) specifying in the data base the manner in which the basic unit shapes for which templates are provided are interconnected,
   (i) viewing through the stereo comparator a first basic unit shape depicted in the stereo-pair photographs and selecting a corresponding template,
   (j) aligning the comparator with a plurality of points on the viewed basic unit shape in turn and operating the comparator readout means to obtain the co-ordinates of those points,
   (k) calculating from the readout co-ordinates the true values for the variable parameters of the corresponding template, and replacing the nominal initial values with these calculated true values, and
   (l) repeating steps (i) (j) and (k) for each template selected thereby to obtain the values of the parameters for each basic unit shape and their three-dimensional interrelation in the structure.

2. A method as claimed in claim 1, in which aligning step (j) includes the step of viewing the points on each basic unit shape in a predetermined sequence characteristic of the type of unit shape being viewed.

3. A method as claimed in claim 2, further including the step of providing an audible prompt to remind an operator of the predetermined sequence while that operator continues to view the photographs.

4. A method as claimed in claim 3 in which said prompt-providing step includes the step of synthesizing speech.

5. A method as claimed in any one of the preceding claims in which the data base is interfaced with a graphics apparatus, to enable the interrelated basic unit shapes to be displayed graphically.

6. A method as claimed in claim 5 further including the steps of superimposing the combined models of the basic unit shapes and their interconnections onto a model of a shaded plane, and removing hidden detail thereby to remove the shading from those areas of the display representing the basic unit shapes and their interconnections, and so contrast them with the intervening shaded areas.

7. A method as in claim 1 further including the step of:
   (m) changing the values of the variable parameters in the template corresponding to an existing basic unit shape, thereby to obtain corresponding information about a second structure which differs from the first in having the said existing basic unit shape modified, moved or removed.

8. A method as claimed in any one of claims 1 or 7 further including the steps of:
   (1) selecting a new template corresponding to a new basic unit shape to be added and entering it into the data base with nominal values for the variable parameters associated therewith,
   (2) repeating step (1) until a new template has been entered into the data base for each new basic unit shape to be added,
   (3) specifying in the data base the manner in which the new basic unit shapes for which templates are provided, are to be interconnected to the existing unit shapes defined previously by said steps (e) or (f), and
   (4) entering, for each new template, true parameter values which define in each case a new basic unit shape which occupies a space not occupied or overlapped by any of the other basic unit shapes in the data base.

* * * * *